Feb. 15, 1944.   D. KELLEHER ET AL   2,341,722
SPIDER
Filed March 17, 1942   2 Sheets-Sheet 1

INVENTORS:
Daniel Kelleher, and
BY James H. Nolan, Jr.
Bates, Teare & McBean
Attorneys.

Feb. 15, 1944.  D. KELLEHER ET AL  2,341,722
SPIDER
Filed March 17, 1942   2 Sheets-Sheet 2
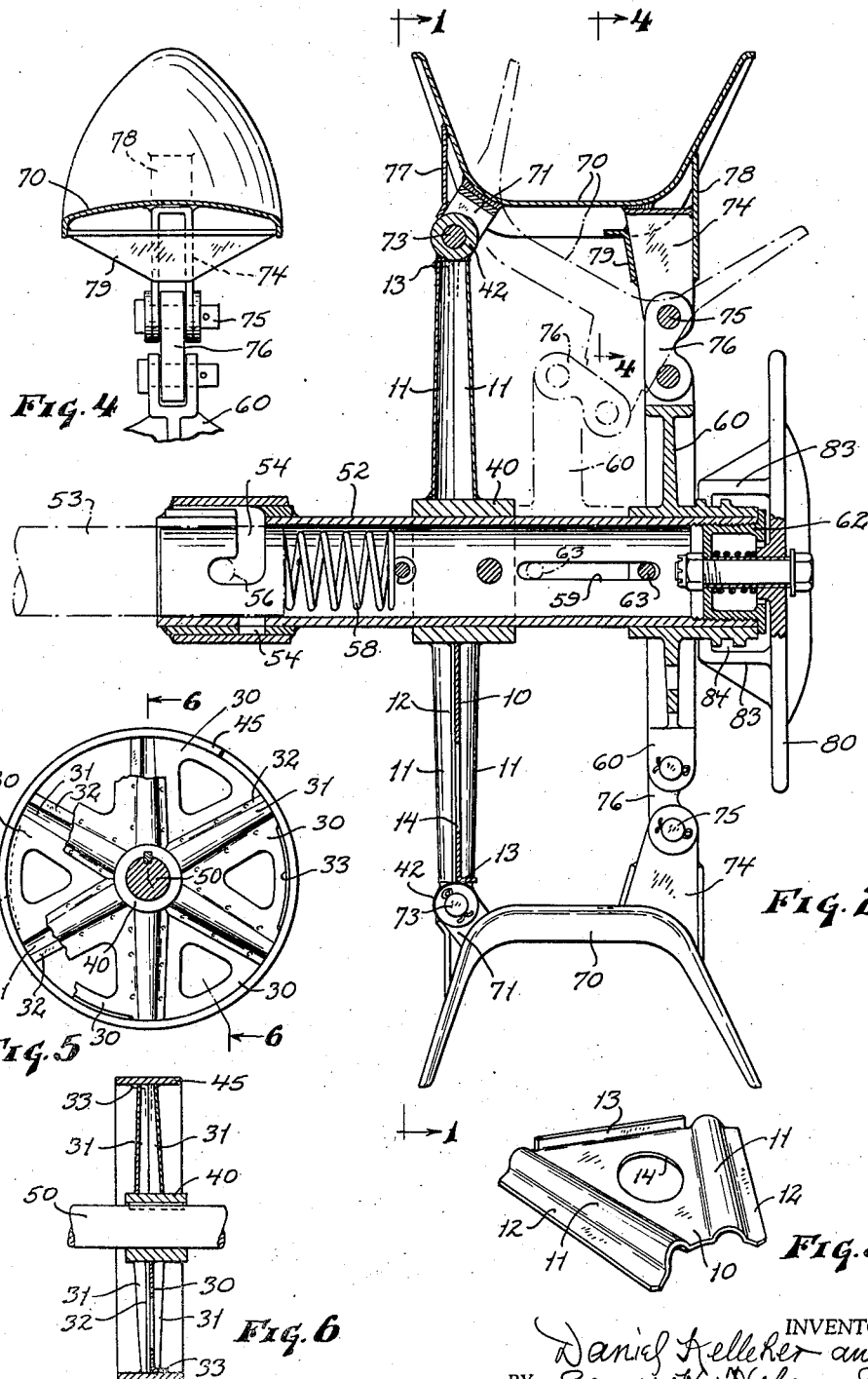
INVENTORS:
Daniel Kelleher and
BY James N. Holan Jr
Bates, Teare & McBean
Attorneys Patented Feb. 15, 1944

2,341,722

UNITED STATES PATENT OFFICE 2,341,722

SPIDER

Daniel Kelleher, Strongsville, and James H. Holan, Jr., Lakewood, Ohio, assignors to The American Coach & Body Company, Cleveland, Ohio, a corporation of Ohio Application March 17, 1942, Serial No. 435,054

7 Claims. (Cl. 242—111)

This invention relates to a spider adapted to provide the body of various rotatable wheel-like devices, for example, reels, pulleys, drums.

It is an object of the invention to provide such a spider of such character and form that the individual parts thereof may be readily made and parts joined together quickly and cheaply. To that end we make the spider web of a series of specially formed stampings, thereafter secured together in a special inter-relation to produce a disc-like member with hollow spokes leading from a hub to a peripheral rim or other construction at the outer edge.

Figure 1:
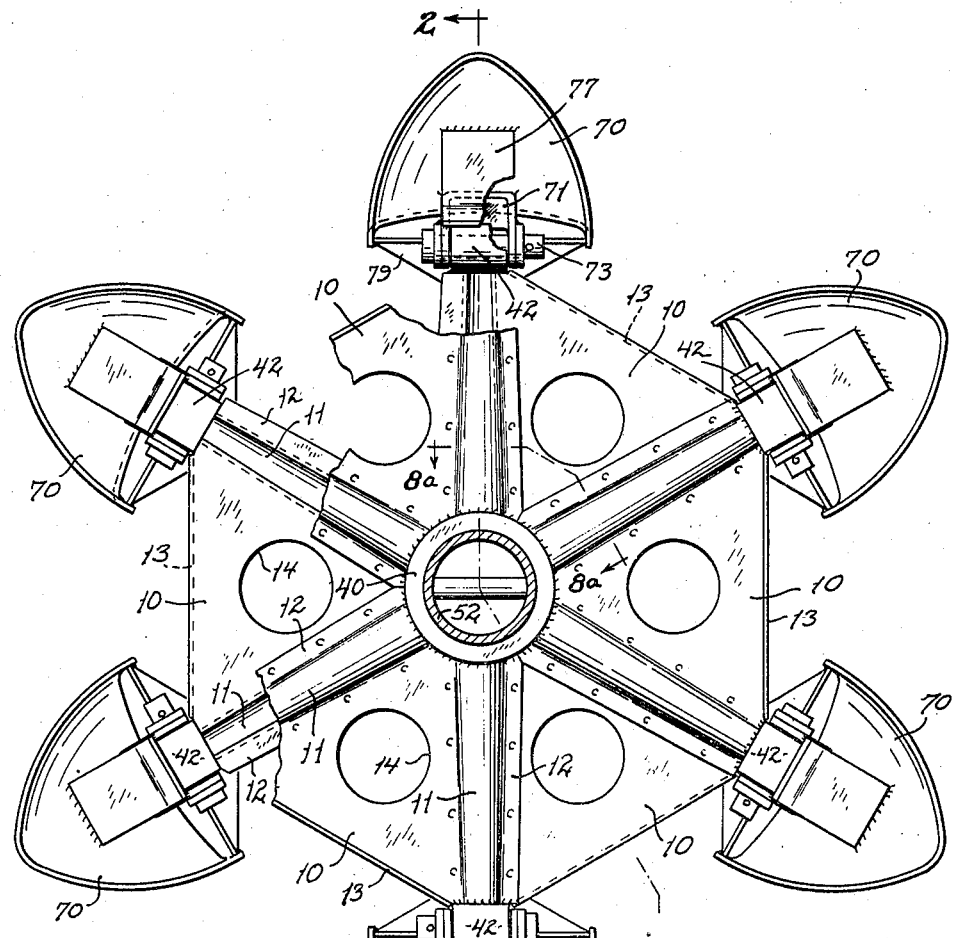
Figure 7:
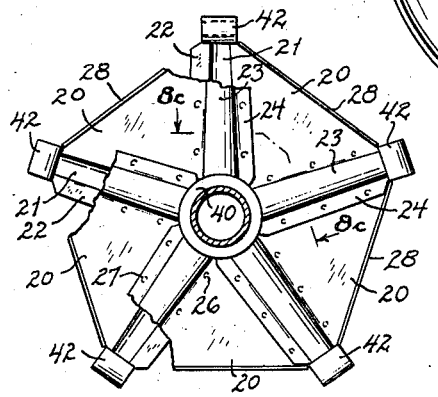
Figure 8:
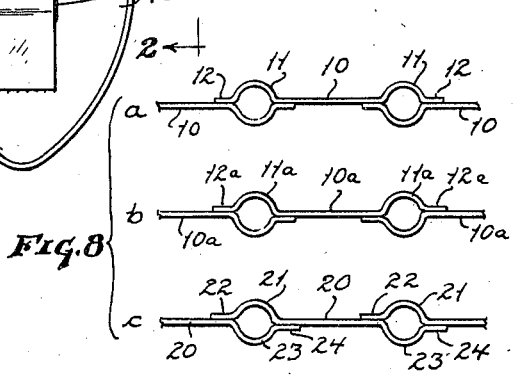

In the drawings, Fig. 1 is a side elevation of one form of our complete spider, partly broken away and shown as carrying at the periphery segments of a collapsible reel; Fig. 2 is an axial section of the reel shown in Fig. 1 in two radial planes, indicated by the line 2—2 on that figure; Fig. 3 is a perspective of one of the set of segments which make up the spider; Fig. 4 is a detail of one of the peripheral members for a reel and certain connecting portions being a section as indicated by the line 4—4 on Fig. 2; Fig. 5 is a side elevation partly broken away of our spider carrying a rim, thus providing a pulley or flywheel; Fig. 6 is a section of such embodiment, on the radial planes, indicated by the line 6—6 on Fig. 5; Fig. 7 is a side elevation partly broken away of a modified form of our spider; Fig. 8 is a collective view illustrating in fragmentary cross section three different forms of spider, namely, the form a on the line a—a in Fig. 1; a slightly modified form b, and the form c on the line c—c in Fig. 7.

The spider of the invention is made up of a series of identical stamped triangular or sector-shaped sheet metal units secured together with their margins in overlapping relation to produce a web with tubular spokes surrounding a hub to which all of the sections are secured.

We will first describe the spider as illustrated in Figs. 1, 2 and 3, and at a in Fig. 8. In these figures, 10 indicates the main body of the spider comprising a triangular sheet, 11 indicates trough-shaped distortions near the edge, and 12 the marginal portion beyond the depression. These distortions are of substantially the form of half truncated cone of very gradual taper, so that when two of them face each other a hollow tubular spoke results.

In the construction of Figs. 1, 2 and 3, the two troughs 11 face in the same direction and the spider is made up by placing segments first facing in one direction and then in the other direction, the trough of each segment overlapping and registering with the trough of the adjacent segment, the parts being secured together in this position by suitable means, preferably spot-welding. At their inner edges the segments are all welded to a cylindrical tube 40 which provides the hub for the spider. The registering troughs of the adjacent spider sections form spokes leading outward radially from such hub.

Each section 10 has its outer edge bent at right angles to the plane of the body as indicated at 13 to stiffen the same. The section may be lightened by forming a hole through it indicated at 14.

The construction as described produces a very light and at the same time strong spider adapted to carry any suitable member or members at the outer periphery thereof. As shown in Figs. 1 and 2, a tubular bearing 42 is welded to the spider at the end of each spoke, useful in connection with carrying the peripheral members of the reel shown, as hereinafter described.

The main portion of the spider segment 10 and the two extreme edge portions 12 thereof may all lie in the same plane, which is very convenient for stamping. If this form of spider segment is used the successive segments will be slightly out of circular registration with each other, as illustrated at a in Fig. 8.

If it is desired to have the body of the segments strictly align, this may readily be accomplished by making the slight change indicated at b in Fig. 8, where the body 10a is the same as before but the troughs 11a have their outer edges set back, resulting in setting back the marginal edge 12a for a distance corresponding to the thickness of the metal. When the margins of such segments overlap the margins of the adjoining segments facing in the opposite direction, the body portion of the segments will all align in a single plane, as indicated by the cross section b in Fig. 8.

If it be desired to provide a spider having an odd number of spokes, this can be readily effected in our invention by making the troughs adjacent the substantially radial edges facing in the opposite direction on each spider. Such construction is illustrated in Fig. 7 and in cross section c in Fig. 8. In this case each segment 20 has near one edge the trough shaped semi-conical depression 21 with a margin 22 beyond it as heretofore described, while at the opposite edge the trough-shaped distortion 23 in the margin 24 faces in the opposite direction. The margins 22 and 24 may be set back the thickness of the metal beyond the plane of the web 20.

It results from the construction just described that any number of segments, odd or even, may be used to make up the complete web, each segment overlapping the adjacent segment to produce the tubular spoke, the parts being secured together by spot-welding as indicated at 26 and 27 in Fig. 7. The segments of this form, shown in Fig. 7, are braced at their outer edges by flanges 28. This view indicates tubular bearings 42 at the outer ends of the spokes, but like the construction heretofore described, a continuous cylindrical rim could be employed as shown in Figs. 5 and 6 in which case the segments would be arcuate at their outer edges.

In Figs. 5 and 6, the segment is made in the form of a sector 30 having spoke-troughs 31 and outer margins 32 and is provided at its outer edge with an arcuate flange 33. These flanges at the ends of the spokes are shown as abutting a cylindrical rim 45 to which the spokes and flanges are welded, thus producing a pulley, shown in the view as mounted on a shaft 50.

The method of making our spider comprises forming the individual segments of sheet metal by stamping operation, then assembling the segments with their margins overlapping to produce spokes, securing adjacent segments together on opposite sides of the half spoke depression in each segment, preferably by spot-welding. A sleeve to form a hub is placed cross-wise of the segments at their common center and welded to each segment. It is understood the parts for the entire spider, including the overlapping segments and the hub sleeve may be assembled and held by a suitable jig and then the welding performed on all of the parts, or the welding may be performed successively joining each spider to the next and then joining all of them to the hub.

To illustrate the adaptability of our device, it is shown in Figs. 1 and 2, as forming the main support for a collapsible reel of the general character shown in Patent No. 2,318,906, May 11, 1943. However, for the sake of completeness, we will describe the parts shown in these figures.

As shown, the reel is provided with a hollow central shaft 52 adapted to be aligned with and mounted on a suitable power shaft 53, shown in broken lines in Fig. 2. As shown, the shaft 52 is provided with longitudinal slots 54 which turn inwardly and serve to engage the ends of a fixed pin 56 which extends through the driving shaft. A spring 58 provided in the shaft 52 is under compression against the end of the power shaft to maintain the parts in engagement.

The spider 10, 11 of this invention is affixed to the reel shaft 52, while a smaller spider 60 is slidably mounted on the shaft, its range of movement being between the hub 40 of our spider and a suitable stop plate, which may be in the form of a flange on a nut 62 screwed into the end of the reel shaft. The spider 60 is prevented from rotating on the shaft by means of a pin 63 which extends through its hub and slides in a longitudinal slot 59 in the shaft.

The two spiders form a rotatable support for arcuate scoop-shaped shoes 70, the bases of which form a rectional rim, the shoes being curved on a radius equal to the curvature of the coil to be carried by the reel, the shoes being saddle-shaped. The shoes 70 have inwardly extending bifurcated brackets 71 provided with holes to receive pins 73 occupying the bearings 42 of our spider. The other ends of the shoes 70 have inward brackets 74 which are pivotally connected by pins 75 to one end of links 76, the other ends of which links are pivotally connected with the bifurcated outer ends of the movable spider 60.

As shown in Figs. 2 and 4, the brackets 71 and 74 are U-shaped sheet metal members welded at their outer ends to the under-surface of the shoes. The brackets 71 are braced by plates 77 welded to the bracket and to the shoe, and the brackets 74 have plates 78 on one side welded to them and to the shoe and on the other side flanged bracing plates 79, welded intermediately to the bracket and at the ends to the shoe.

The pivotal or link connections to the movable spider 60 and the shoes 70 form toggles, which when collapsed assume the position in dotted lines in Fig. 2. This tips the shoes and enables the coil of wire or rope which may be wound on the reel to be removed bodily.

To collapse the reel whenever desired, there is provided a control member in the form of a rotatable handle 80 positioned on the outer end of the shaft 52 and having diametrically opposite fingers 83 which engage helical grooves 84 in the hub of the spider 60. When the reel is in an operating position, as shown in Fig. 2, a left hand or a counter-clockwise rotation of the handle 80 forces the sliding spider inwardly to break the toggle and tip the rim members into the collapsed position indicated in broken lines.

It will be seen that our spider is well adapted to carry the various stresses, whether in compression, tension, or bending, to which the main support of a reel may be subjected. If the reel were non-collapsing, a rigid spider of our invention could take the place of the shiftable spider and toggle mechanism shown in the drawings. Two of our spiders on a shaft may carry a wide cylindrical drum if desired, or a single spider may carry a pulley rim as shown in Figs. 5 and 6. As our spider is adapted for various other uses, disclosures in the drawings should be taken merely as illustrations of a wide variety of specific adaptations.

We claim:

1. A spider comprising a set of segments arranged about a center, each segment circumferentially overlapping the adjacent segment and secured to it, the segments where they overlap being distorted each away from the other segment to form hollow spokes.

2. A spider made up of a series of three-edged segments overlapping each other at two of their edges in planes substantially normal to the axis of the spider, the segments being distorted in the overlapping region to provide hollow spokes, the third edge of the segment being flanged to stiffen it between the spokes.

3. A spider comprising a hub and a set of approximately triangular segments arranged about the hub to form a complete circuit, each segment extending across and beyond the edge of the adjacent segment, each segment being formed with troughs leading outwardly from the hub in the overlapping region of the segments, the two cooperating troughs forming hollow spokes, the segments being secured to each other where they overlap and all of them secured to the hub.

4. A spider comprising a hub and a web formed of a set of approximately triangular sheet metal members circumferentially overlapping each other, said members being distorted adjacent the edges to provide depressions or troughs in the overlapping region, each trough of one segment registering with a trough of the adjacent segment to provide a hollow spoke, said segments being welded at their inner ends to the hub and being welded to each other on opposite sides of the spokes.

5. A spider comprising a hub, a series of segments arranged about the hub each segment circumferentially overlapping the adjacent segments on opposite sides thereof to make a complete circuit about the hub, the segments in the overlapping region being formed with radial trough-like portions to produce hollow spokes and tangentially arranged tubular bearings welded to the ends of the spokes.

6. A spider comprising a hub, a series of sector-shaped segments arranged about the hub, each segment circumferentially overlapping the adjacent segments thereof to make a complete circuit about the hub, the segments in the overlapping region being formed with radial trough-like portions to produce hollow spokes and a cylindrical rim surrounding the spider and secured to the ends of the spokes, each segment having an arcuate flange at its outer edge lying along the inner face of the rim and attached to it.

7. A spider made up of a circuit of segments of sheet material of approximately triangular form, each segment having a marginal portion extending beyond the marginal portion of the adjacent segment and lying against it, the segments in the region of their circumferential overlap being radially deformed away from each other to provide hollow spokes, each segment being secured to the adjacent segment along opposite edges of such spokes.

DANIEL KELLEHER.
JAMES H. HOLAN, Jr.